J. F. DELAHANT.
ELECTRIC TOASTER.
APPLICATION FILED OCT. 19, 1916.

1,230,384.

Patented June 19, 1917.

Inventor
John F. Delahant.
By his Attorney

UNITED STATES PATENT OFFICE.

JOHN F. DELAHANT, OF NEW YORK, N. Y.

ELECTRIC TOASTER.

1,230,384.  Specification of Letters Patent.  Patented June 19, 1917.

Application filed October 19, 1916. Serial No. 126,514.

*To all whom it may concern:*

Be it known that I, JOHN F. DELAHANT, a citizen of the United States, residing at New York, in the county of New York and State of New York, have invented a certain new and useful Improvement in Electric Toasters, of which the following is a specification.

The invention is an electric toaster, and consists in the construction hereinafter set forth, whereby the toast becomes wholly inclosed in a casing, two walls of which are comprised in the downwardly and outwardly swinging door.

In the accompanying drawings—

Figure 1:
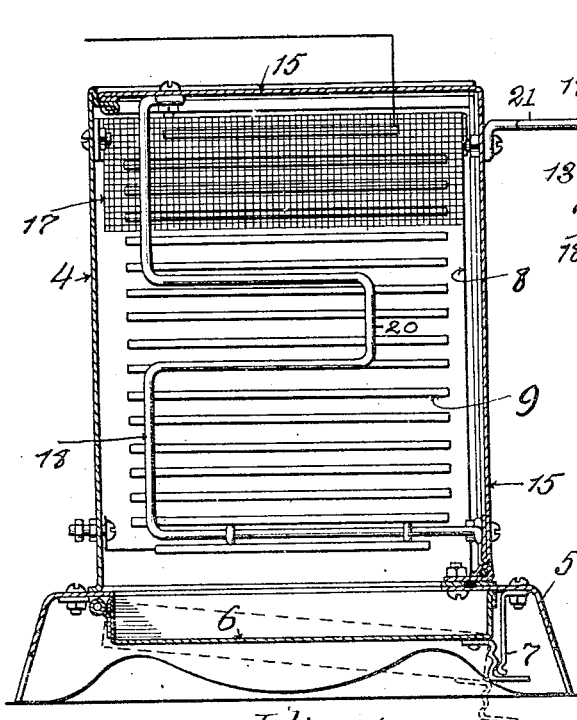
Figure 2:
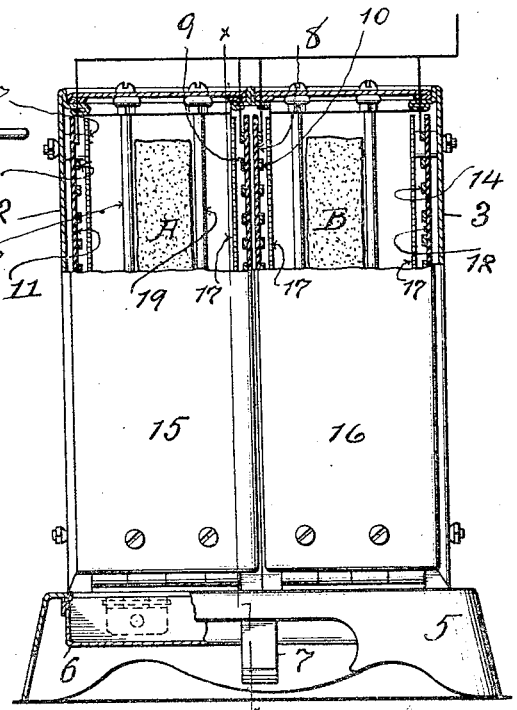
Figure 3:
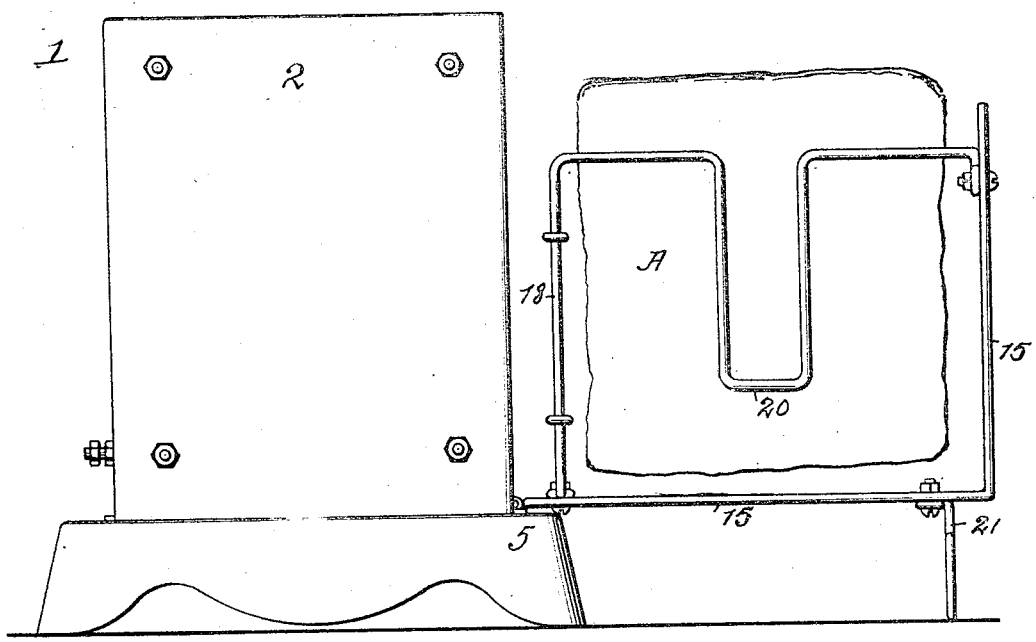

Figure 1 is a vertical section of my electric toaster on the line $x, x$ of Fig. 2. Fig. 2 is an end elevation, showing the upper part of the closed doors and a portion of the base and pan broken away to exhibit the interior in transverse vertical section. Fig. 3 is a side elevation, with the doors open for the reception of the bread to be toasted.

Similar letters and numbers of reference indicate like parts.

The casing 1 of sheet metal has two vertical side walls 2, 3, an end wall 4 and a base 5 upon which said walls are secured. There is an opening in said base which is closed by the pan 6, hinged to said base at its rear edge and held in closed position by a spring latch 7. The object of the pan is to receive crumbs from the toast, which can be removed from said pan by releasing the latch 7, and allowing the pan to drop, as indicated in dotted lines Fig. 1.

Within the casing is a vertical partition 8, here shown as formed of two plates of mica or other insulating material. Said partition divides the space within the casing into two compartments, each designed to receive a slice of bread to be toasted. On the outer sides of the partition 8 are secured the heating elements 9, 10, preferably of wire carried to and fro over the surface of the partition to form a grid of suitable area. On the inner sides of the walls 2, 3 are similar insulating plates 11, 12, carrying respectively heating elements 13, 14, similar to elements 9, 10. The heating elements 9 and 11 coöperate to toast both sides of the slice of bread A in one compartment, and the heating elements 10 and 14 coöperate to toast both sides of the slice of bread B in the other compartment. The heating elements are connected in multiple in the usual way.

Each compartment is provided with a separate door 15, 16, formed of two members disposed at right angles, the lower member being hinged at its lower edge to the base 5. When said door is raised, it closes the gap between the walls 2, 3, and thus the slice to be toasted becomes completely inclosed in a metal shell formed by said door, the side walls 2, 3 and end wall 4 and the pan 6. This closed shell prevents convection currents from passing over the slice to be toasted, and confines the heat radiated from the heating elements, so that practically all of said heat is utilized upon the bread surfaces. In order more equally to diffuse said radiated heat, I dispose in front of each heating element a screen 17 of wire gauze, preferably affixed to the element supporting plate. Said screen prevents the marking of the bread surface in stripes, corresponding to the heating grids, and causes said surface to be uniformly carbonized.

On the inner side of each door is secured two similar bent wire rods 18, 19, which together with the door form a supporting holder or rack for the bread. When the door is swung outwardly, the slice, as shown in Fig. 3, is placed in the holder. A portion of the holder wires at 20 is bent inwardly to enable the fingers of the operator more conveniently to introduce the slice into the holder and to remove the same therefrom without danger of burning himself. The door may be operated by the handle 21 fastened on its outer side, which handle also serves as a strut to support the lower member of said door in horizontal position, as shown in Fig. 3. The holder is to be so placed on the door as that when the door is closed, the slice in said holder will be carried into proper position between the heating elements in the compartment having said door, with the faces of said slice respectively parallel and opposite to the heating elements in said compartment—or, in other words, in proper position for toasting. By reason of the slice holder being placed on the door, the slice is manipulated to place it in or withdraw it from its holder, entirely outside of the heating compartment.

The toasting of the bread after it has been placed in proper position by the closing of the door, or doors, is done largely by radiant heat. As the bread is adiathermanous to the passage of radiant rays, its surface is thus made crisp. The heat does not penetrate to any substantial extent, and as the heat is applied simultaneously to both sides of the slice, the moisture is driven in, so that the toast is brittle on the outside and soft and spongy within.

By reason of the arrangement of the heating elements, so as to act upon both sides of the slice simultaneously, and of the inclosure of the slice in the metal shell, as already described, I find that a large economy in current consumption results. Because of this economy, I am enabled to use two compartments in the casing, each of sufficient size to receive a slice of bread four by four inches in surface, and to cause said slice to be toasted with consumption of current not exceeding 660 watts—the maximum consumption now allowed by the Board of Fire Underwriters for lamp socket appliances. It is of especial importance that in a device of this class, the current consumption should not exceed the foregoing maximum, otherwise special wiring would be required which would largely increase its cost. I do not know of any toaster other than that herein described, which can be safely connected to the ordinary lamp socket appliances, and which will toast a plurality of slices of bread, each simultaneously on both sides.

I may construct my device without the middle partition, using but one door and suitably approximating the heating elements on the side walls, or I may add a third compartment. I prefer a plurality of compartments, since the economical output is thus increased, and, if desired, two slices differing in contained moisture may be toasted, without the drier slice being overdone before the toasting of the moister slice is completed.

I claim:

1. An electric toaster, comprising a base, vertical side walls and an end wall, heating elements supported between said side walls and separated by a space for the reception of the object to be toasted, and a door hinged at its lower portion to said base and formed of two members disposed at right angles and covering the gap between said side walls.

2. An electric toaster, comprising a base, vertical side walls and an end wall, heating elements supported between said side walls and separated by a space for the reception of the object to be toasted, a door hinged at its lower portion to said base and formed of two members disposed at right angles and covering the gap between said side walls, and a holder for the object to be toasted secured upon the inner side of said door.

In testimony whereof I have affixed my signature in presence of two witnesses.

JOHN F. DELAHANT.

Witnesses:
   GERTRUDE T. PORTER,
   MAY T. McGARRY.